United States Patent [19]

Lemelson

[11] 4,175,883

[45] Nov. 27, 1979

[54] COMPOSITE STRUCTURAL MEMBERS AND FASTENING METHODS

[76] Inventor: Jerome H. Lemelson, 85 Rector St., Metuchen, N.J. 08840

[21] Appl. No.: 830,063

[22] Filed: Sep. 2, 1977

[51] Int. Cl.$^2$ .......................... B25G 3/00; F16B 7/00
[52] U.S. Cl. ........................................ 403/347; 256/65
[58] Field of Search .............. 403/187, 191, 263, 375, 403/380, 346, 347, 400; 256/65, 66, DIG. 4; 248/156, 159

[56] References Cited

U.S. PATENT DOCUMENTS

| | | | |
|---|---|---|---|
| 806,743 | 12/1905 | Hurlburt | 256/DIG. 4 |
| 2,976,346 | 3/1961 | Bellamy | 248/156 X |
| 3,067,717 | 12/1962 | Imparato | 248/156 X |
| 3,973,756 | 8/1976 | Lauzier | 256/65 X |
| 3,993,289 | 11/1976 | Lewis et al. | 256/65 X |

*Primary Examiner*—Wayne L. Shedd

[57] ABSTRACT

Composite moldings are provided defining structural members such as beams, stakes and poles for use in a variety of applications including the fabrication of fences, frames and other architectural structures wherein a plurality of structural members or planks are secured together by means of the composite moldings. In one form, the composite moldings are formed of elongated structural core members such as rods, tubes, angles, channels, box-beams or otherwise shaped members, preferably but not necessarily, made of metal which are disposed within a mold after which a cellular plastic material is cast or injection molded thereabout to form a sheathing. The sheathing may be decorated or shaped to represent a wood grained structure and the core member may extend from either or both ends thereof for fastening purposes and to permit the composite molding to be driven into the ground or secured to an anchoring material such as concrete. In another form, the sheathing is especially shaped with one or more cavities therein to permit attachment of other structural devices such as rods, tubes, beams or planks, to the composite molding, to form fences, frames and the like thereof.

11 Claims, 13 Drawing Figures

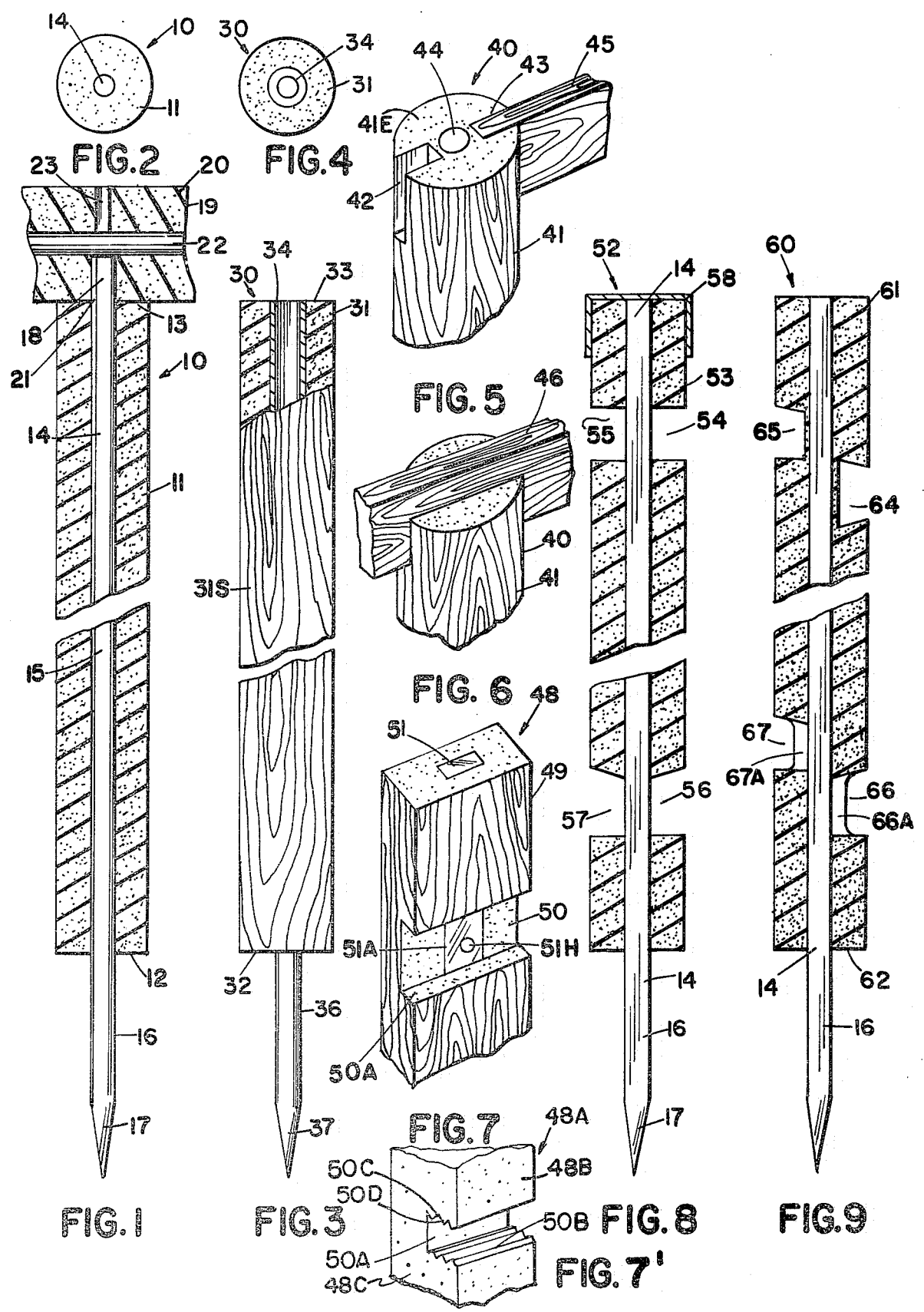

COMPOSITE STRUCTURAL MEMBERS AND FASTENING METHODS

SUMMARY OF THE INVENTION

This invention relates to composite structures in the shape of elongated beams, planks or poles formed with high strength core members preferably made of metal, and surrounded by a sheathing material, preferably made of structural cellular plastic which is molded or extruded in situ against the core member. Such composite moldings may be employed as poles or stakes for use in a variety of applications above the ground, such as upright retainers for fencing, frames for use in architectural structures and the like. The high strength core members serve a number of purposes including, in addition to substantially enhancing the strength of the molded structure, attaching same to other structures, penetrating the ground and serving as a means against which impact forces may be applied to cause the composite molding to be fastened to the ground.

Accordingly, it is a primary object of this invention to provide new and improved structural members formed of a plurality of materials including a high strength core portion and a lightweight sheathing which is preferably made of a plastic resin and is cellular in structure. While the core member strengthens and permits the composite molding to be fastened to the ground, the sheathing serves a number of functions including, in addition to improving the appearance of the article so formed, a means for fastening other structural members thereto and as a protection for the core member from corrosion and as an impact absorbing medium. The sheathing may be shaped to support other structural members in frictional assembly therewith or by providing surface portions which directly support surface portions of the other structural members. In a particular form, the core member may be exposed through cavities in the sheathing or by penetrating the sheathing and may be utilized to enhance the fastening of structural members by means of fasteners or welding thereto.

Accordingly, it is a primary object of this invention to provide new and improved structures in composite moldings which are particularly applicable to the assembly of fencing, architectural frames and other large structures requiring a skeletal support.

Another object is to provide a new and improved fence post which is formed of plastic and metal.

Another object is to provide a structural member for use in building construction, fencing and the like which contains an outer sheathing portion having the appearance of wood and provided with a central portion of substantially higher strength than the outer portion.

Another object is to provide a structural member formed of lightweight plastic material surrounding a high strength core material wherein the plastic material is molded to shape with one or more cavities or otherwise shaped formations for facilitating and effecting the attachment of other structural members thereto such as planking, panels, structural members, tubing and the like.

Another object is to provide a composite structural member for use in forming structural frames and the like which structural member is exteriorly shaped to permit rapid and easy assembly with other structural members.

Another object is to provide an improved fence post or stake formed of plastic and metal, which may be impact driven at one end thereof into the ground without deforming or destroying the plastic portion thereof.

Another object is to provide a structural member formed of plastic and metal for supporting building or architectural components and the like wherein the major portion of the support for the structural member is provided by a metal core thereof.

Another object is to provide an apparatus and method for forming composite structural members by molding or casting.

Another object is to provide an apparatus and method for forming composite structural members by extrusion.

Another object is to provide a composite structural member formed of a cellular plastic sheathing cast or molded about a metal core wherein the core is specially shaped to facilitate attachment of other structural members thereto and to improve the securing of the sheaving to the core.

With the above and such other objects in view as may hereinafter more fully appear, the invention consists of the novel constructions, combinations and arrangements of parts as will will be more fully described and illustrated in the accompanying drawings, but it is to be understood that changes, variations and modifications may be resorted to which fall within the scope of the invention as claimed.

In the drawings:

FIG. 1 is a side view with portions broken away and sectioned for clarity of a structural assembly including a composite molded stake or post adapted to be partially driven into the ground for support above the ground and also illustrating a composite structural member secured to the upper end of the post, preferably after the post is driven into and supported in an upright condition above the ground;

FIG. 2 is an end view of the post of FIG. 1;

FIG. 3 is a side view with a portion broken away and sectioned for clarity of a modified form of the post or stake illustrated in FIG. 1;

FIG. 4 is an end view of the post of FIG. 3;

FIG. 5 is an isometric view of the upper portion of a modified form of the structural member of FIG. 3 having a pair of molded recesses formed in the upper extremity thereof and also showing a plank or structural member fitted into and supported by the walls of one of the recesses;

FIG. 6 is an isometric view of the upper portion of the post of FIG. 5 showing a notched beam assembled across the top end thereof and supported within the pair of recesses molded in the end of the beam;

FIG. 7 is an isometric view of the upper portion of a composite rectangular beam formed by molding and also illustrating a molded recess in the side wall thereof to facilitate and effect assembly of one or more horizontal beam members thereto;

FIG. 8 is a side view with parts broken away and cross sectioned for clarity of an elongated structural member which is a modified form of that illustrated in FIG. 1; and FIG. 9 is a side view with parts broken away and sectioned for clarity of a modified form of the structure illustrated in FIG. 8;

Figure 10:
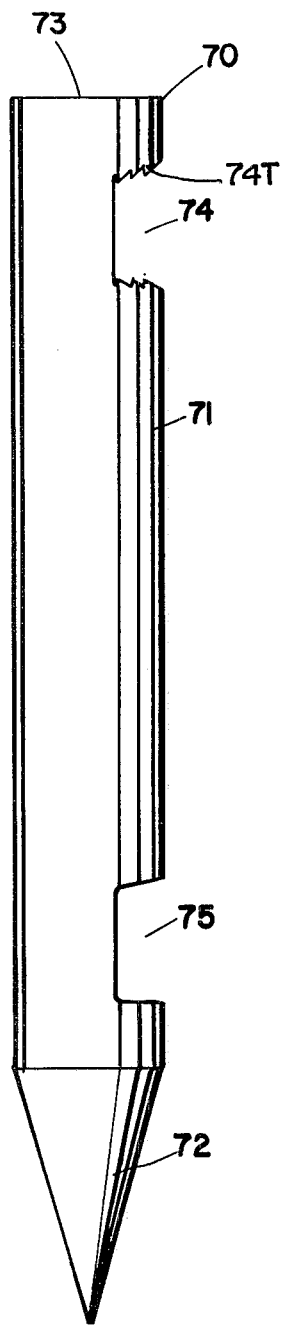
Figure 11:
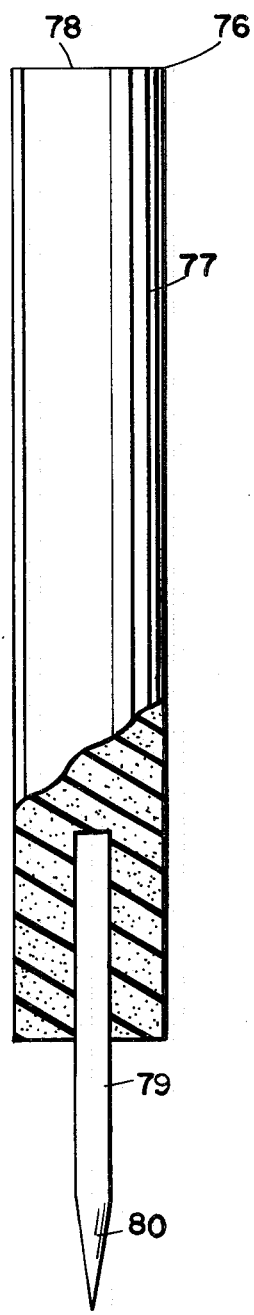
Figure 12:
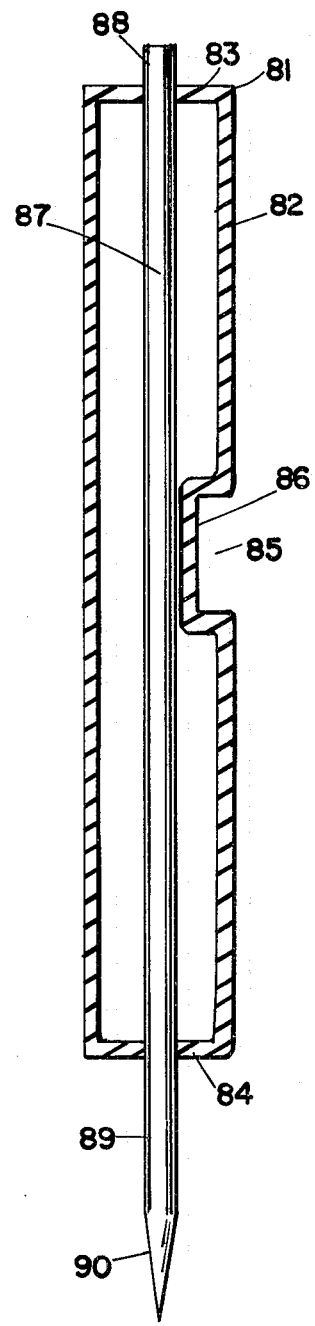

FIG. 7' is an isometric view of a fragment of a modified beam formed by molding with a channel-like formation extending inwardly from a side wall thereof wherein the channel has side walls with irregular formations such as serrations or teeth which are adapted to frictionally grip and hold a panel, similar beam, rod, tube or other member in compressive assembly within the channel so as to eliminate the need for fasteners;

FIG. 10 is a side view of a beam having certain features illustrated in FIGS. 7 and 7';

FIG. 11 is a side view with a portion broken away for clarity of a modified form of molded plastic beam having a steel or otherwise formed stake or pin molded at one end thereof to permit the beam to be driven into the ground or held in a solidified concrete mass; and FIG. 12 is a side view with a portion sectioned for clarity of a beam formed with a hollow shell retaining an elongated rod or tube extending axially therethrough and adapted to be driven into the ground.

In FIG. 1 is shown a composite molding 10 in the form of an elongated structural member defined by an outer sheathing 11 of substantially cylindrical external shape and having a core member 14 which is preferably secured within the sheathing 11 during the molding process. The core member 14 may also be inserted into a passageway extending through the sheathing 11 and provided therein by molding. The core member has a central portion 15 which is totally surrounded by the molded sheathing 11, a lower end portion 16 which protrudes from the lower end face 12 of sheathing 11 and an upper portion 18 which protrudes longitudinally from the upper end wall 13 of the sheaving 11. The lower end 17 of the protruding portion 16 of the core member 14 is shown tapered or pointed to permit it to be inserted into the ground to hold the composite molding 10 firmly within and above the ground.

Shown secured to the upper end and preferably abutting the end wall 13 of sheathing 11 is a second composite molded structural member 19 which may extend across and between two or more composite structures similar to the composite molding 10 of FIG. 1. The assembly may comprise a frame, a fence or other structure desired to be exposed above the ground. Structural member 19 is formed with a plastic resin sheathing 20 completely surrounding an elongated rigid structural member 22. Notation 21 refers to a radial hole in the sheathing surrounding the core member 22, into which hole the protruding end portion 18 of the core member 14 passes and engages the exterior wall of the core member 22. Notation 23 refers to a passageway aligned with the passageway 21 abd into which passageway may be inserted a welding tool for welding the abutted end portion of structural member 14 to the side wall of elongated structural member 22. Adhesive bonding or thermoplastic welding may also be provided between the end face of the sheathing 11 and the side wall of the sheathing 20.

In FIGS. 3 and 4 is shown an elongated post or upright structural member 30 formed of a sheathing 31 completely surrounding a tubular structural member 34. Protruding outwardly from the outer end 32 of sheathing 31 is an extension 36 of the tubular member 34 and the lower end 37 thereof tapered or sharpened to define a surface penetrable point or wedge-like device for easily securing the structural member 30 into the ground at its lower end.

It is noted that the upper end of the tubular formation 34 is shown to be flush with the end wall 33 of the molded sheathing 31, a construction which like that shown in FIG. 1, enables a hammer to be brought to bear against the upper end of tubular member 34 without destroying the material defining the upper end portion including the end wall 33 of the molded sheathing or jacket 31.

By utilizing a tube 34 made of aluminum or steel as the core of the elongated structural member 31 of the embodiment of FIGS. 3 and 4, it is noted that one or more metal or plastic beams, rods, tubes, planks or other devices such as fittings may be secured to the upper end of the post or stake 30 by means of pins, fasteners or protrusions thereof inserted into the open upper end of the core member. Accordingly, the inside of the upper end of core member 34 may be threaded to receive a threaded fastener passing through or clampingly engaging the device being fastened to the end wall 33. Also, if the upper end of the tubular core member 34 extends beyond the upper face or wall 33, it may be exteriorly threaded to receive a threaded collar or nut, or to be passed through an opening through a structural member or other device to be fastened to the upper end of the structural member 30. To improve such assembly, a metal or plastic washer or fitting may be disposed against the end wall 33 and bonded or retained thereon by the clamping engagement of the assembly secured thereto or may be welded to the exposed exterior or interior surface of the tube or pipe 34. In a like manner, the upper end portion 18 of the rod 14 of the embodiment of FIG. 2 may also be exteriorly threaded to receive a threaded collar or nut for retaining a structural member or fitting against the end wall 13 to form a fence, frame or other assembly.

While the sheathings or coverings 11 and 31 of the embodiments illustrated in FIGS. 1-4 are shown as cylindrical in external shape, it is noted that they may also be rectangular or square shaped in lateral cross section to facilitate the assembly of covering sheets or panels to either or both opposite faces of the structural members for forming partitions, walls and the like thereof. In FIG. 3 the exterior surface 31S of the molded jacket or covering 32 is shown having a molded texture simulating the grain of wood thus giving the appearance of a wooden beam. Surface 31S may thus be colored by in-mold decoration, spraying, silkscreening or other means to simulate wood or may have any other texture or decoration provided thereon.

In a modified form of the embodiments of FIGS. 1-4, the rod-shaped core member 14 or the tubular core member 34 may extend either flush with the end walls 12, 13 and 32,33 of the composite moldings 10 and 30 or they may protrude one or more inches from the ends of the plastic jackets or sheathings 11 and 31 for fastening purposes. Furthermore, the tubular core member 33 of FIGS. 3 and 4 may also comprise a rectangular steel, aluminum or extruded plastic duct or beam which may be utilized for conducting a liquid or heat transfer fluid, such as conditioned air, through the beam for heating, ventilating, or air conditioning purposes. Either or both ends of the structural members 10 and 30 of FIGS. 1-4 may also contain plastic or metal fittings secured thereto by molding or by bonding to serve such purposes as attaching the beams, retaining fasteners or effecting fluid coupling between core members of adjacent structural members.

If a sheet metal or plastic cap is disposed against the lower end walls 12 and 32 of the embodiments of FIGS. 1 and 3, it may serve to protect the plastic sheathing from deformation or destruction when the stakes or posts are driven into the ground.

In FIG. 5 is shown a composite structural beam or post 40 formed with an external jacket 41 which is extruded or molded of a plastic resin, such as the described structural foam, about a core member 44 which may comprise a steel, aluminum, plastic or other material formed into a rod or may be tubular in shape as illustrated in FIGS. 3 and 4, and extends, as described, completely along the length of the structural member 40 and protrude from the lower end thereof. Mold formed in the upper end of the jacket 41 are a plurality of cavities 42 and 43 which are substantially rectangular in shape and are adapted to receive the ends of respective plastic or wooden planks, one of which 45 is illustrated as extending laterally and horizontally from the post 40 which serves as an upright support therefor. Accordingly, by providing two or more posts 40 spaced apart from each other, a frame or fence may be constructed by securing planks or beams such as 45 therebetween. Planks or beams 45 may be cemented with an adhesive to the walls of the cavities formed in the upper end of the sheathing 41 or may be fastened with nails thereto.

If the post or structural member 40 is to be utilized as a corner of the frame of fence wherein structural beams or planks are to extend at right angles to each other, the cavities 42 and 43 may also extend at right angles to each other for such purpose or one or two additional cavities may be provided 90° apart in the upper end of the sheathing 41 to permit structural members or planks such as 45 to extend in three or more directions, if necessary to form a suitable frame thereof.

In FIG. 6 the structural member or post 40 of FIG. 5 is shown having a notched plank or beam 46 contained within the cavities 42 and 43. The notch or cut-out (not shown) in the beam 46 is provided to accommodate the material between the cavities 42 and 43 of the upper end of the post 40 and may provide frictional assembly of the plank 46 with post 40 or sliding assembly wherein adhesive or nail fasteners may be used to hold the assembly together. If the core member 44 terminates a distance below the end wall 44E of the sheathing 41 and the cavities 42 and 43 are replaced by a single cavity extending completely across the sheathing 41, the plank 46 need not be notched and may be held in the single cavity, as shown in FIG. 6, by friction, adhesive, or nail fasteners.

In FIG. 7 is shown a modified form of a composite plank, post or structural member 48 which is formed by molding a structural plastic sheathing 49 of rectangular cross-section about a rectangular core member 51 which extends completely through the beam or post 48 in the manner described. The rectangular core member 51 may comprise a steel or aluminum rod or a box beam. Notation 50 refers to an indented or notched portion of the sheathing 49 which is molded or machined therein near the end of the beam or post and which exposes a portion 51A of the side wall of the core member 51 to permit it to be welded or fastened to when it is desired to assemble a metal, plastic or wood plank, beam or other device thereto in constructing a frame or fence thereof. Also shown in FIG. 7 is a cavity or hole 51H extending partially or completely through the core member 51 which hole or cavity may be threaded to receive a fastener such as a machine screw, bolt or rivet for securing one or more planks or other structural members thereto. The bottom wall 58 of the notched portion or cavity 50 may be utilized to support the plank or beam disposed therein and it is noted that a frictional or loose fit may be effected between the two elements upon their assembly wherein an adhesive may be disposed between the mating surfaces for retaining the assembly together.

Modified forms of the embodiment illustrated in FIG. 7 may include the provision of a plurality of notched portions or cavities similar to 50 at the same or different locations along the length of the beam or post 49 for receiving and retaining other structural members or planks to form complex frames thereof. For example, in FIG. 8 composite structural member or post 52 is shown formed of a jacket or sheathing 53 molded or assembled about a rod-like core member 14, shaped as described, and having a plurality of cavities or notched portions denoted 54, 55 and 56, 57 which are located, as illustrated, near the upper and lower ends of the jacket of the composite structural members. Notation 58 refers to a cap formed of sheet metal or plastic and extending completely across and against the upper end of the sheathing 53 and rod 14.

In FIG. 9, a composite structural member or post 60 includes a sheathing 61 which is molded or otherwise formed around a rod 14 of the type described and which contains cavities 64, 65 and 66, 67 which are respectively staggered from each other near the upper and lower ends of the sheathing. Cavities 64 and 65 extend almost although not completely to the opposite surfaces of the core member 14. The cavities 66 and 67 extend to the surfaces of the core member 14 and each contains side wall portions denoted 66A and 67A for supporting the ends of beams, rods or tubes assembled to the structural member 60. Such rods or tubes may be welded to the core member 14 or extend therethrough by piercing or drilling holes through the core.

It is noted that the various embodiments illustrated in FIGS. 1-9 may each be modified and contain features of the other embodiments incorporated therein. Being that the sheathing or jacket portions of each embodiment are formed of moldable or castable materials, a variety of modifications in the shapes thereof may be effected without difficulty, which may include, in addition to molding cavities or notched portions in the side walls thereof, variations in external shape for accommodating additional members or assemblies against the outside wall portions of the composite moldings. It is also noted that in certain instances, the illustrated embodiments may be further modified by the elimination of the core members or merely by extending the core members only partially through the plastic portions of the embodiments illustrated. For example, the core members 14 and 34 of the embodiments of FIGS. 1 and 3 may be merely disposed within the lower portions of the posts 10 and 30 to facilitate the insertion of the posts into the ground or may be replaced by tubular metal formations which are conically shaped and extend completely around the lower ends of the plastic jackets or sheathing to facilitate such insertion.

FIG. 7' shows a modified form of the plank or post of FIG. 7, wherein a channel-like formation 50A is provided with sidewalls 50B and 50C containing serrations or teeth 50D molded or otherwise formed therein and operable to either intermesh with similar formations or serrations molded in the border portion of a panel, post or plank when the latter is inserted into the molded channel and compressively forced therein or to deform and frictionally grip the parallel flat walls of a plank, beam, panel or post forced into the channel from the front face 48B of the beam or post 48A or when inserted therein from the sidewall 48C thereof. In other words, the teeth 50D formed in either or both side walls 50B and 50C may deform when the plank or panel is forced therein and thereafter frictionally grip the opposite faces of the member assembled to member 48A without the need for fasteners to hold the two together.

In FIG. 10 a fence post or frame post 70 is formed entirely of injection molded or extruded plastic and is shaped with an elongated cylindrical body portion 71 molded or extruded integral with a conical portion 72 at its lower end which is rigid enough to penetrate the ground when a sledge hammer or other driving device is pushed or otherwise driven against the upper end 73 of the post. Notations 74 and 75 refer to indentations or channel-like formations molded or cut in the body portion 71 near the upper and lower ends thereof for receiving and holding respective planks, slats or otherwise shaped structural formations to be assembled with two or more of the posts 70 which are supported above the ground near and parallel to each other.

Either or both side walls of the channels 74 and 75 are tapered slightly to facilitate insertion of beams or panels or slats therein. The tapers may be such as to permit a jam fit of the structural members forced therein. The walls of the indentation 74 are shown having serrations or teeth 74T molded or cut therein which teeth or serrations may serve to frictionally grip, bite into the mate with serrations or teeth formed in the structural member forced in assembly into the channel-like formation. In other words, if the structural member which is forced into the channel is a yieldable plastic or plank of wood, the teeth 74T may bite into the surface stratum of the plank and serve to frictionally grip and prevent removal of the plank from the indentation. It is noted that one or more additional channel-like indentations, such as 75, may also be molded in the body portion 71 and provided with teeth similar to 74T. The teeth 74T may also be provided in a metal or injection molded plastic insert which is secured within one or more channel-like formations such as 74 and 75 to more tenaciously grip and hold the slat or structural members inserted therein. Such metal or plastic insert may be bonded or secured by molding or fasteners to the member 70.

FIG. 11 shows a post or stake 76 formed with a main body 77 which is a plastic molding or extrusion, preferably of structural plastic foam and having a flat upper end face 78 and a lower end portion containing a metal stake or rod 79 secured therein by molding or insertion into a hole extending from the lower end face of the molding 77. The lower end of the stake 79 is tapered at 80 permitting it to be driven into the ground and to support the main body thereon above the ground. Although not shown, the main body 77 may be mold formed with one or more indentations or channels such as provided in FIGS. 8-10 or cavities as in the embodiments of FIGS. 5 and 6.

In FIG. 12 a post or stake 81 is shown which has a main body portion 82 formed by blow molding or rotationally molding a rigid plastic resin. If rotationally molded, an elongated metal rod or tube 87 may be disposed across the mold and used as an internal support for the hollow plastic portion of the stake and also as a means for fastening the stake to the ground when the tapered or pointed lower end 90 is driven into the ground by applying blows or a force to the upper end 88 of rod 87 which protrudes from the end wall 83 of molded portion 81. Sufficient length of member 87 defined by a portion 89 which protrudes from the lower end wall 84 of 81 is provided to permit sufficient penetration of the ground to support the assembly or composite molding above the ground.

Notation 85 refers to an indentation or cavity molded in the side wall of the main body portion 82. The bottom wall 86 of indentation 85 is shown in engagement with a portion of the side wall of the rod or tube 87 and provides for and is supported by said rod or tube. A plurality of such indentations may be provided for the described purposes of supporting other structural members and the molded material on the rod or tube. It is also noted that the volume interior of the hollow molding defining body portion 82 may be filled with a structural plastic foam, Portland cement, concrete or other suitable structural material.

I claim:

1. An elongated composite structural member for use in constructing assemblies above the ground comprising in combination:
   an elongated metal structural core member,
   one end of said structural core member being shaped to permit and facilitate its penetration of the ground,
   a sheathing formed of structural cellular plastic resin,
   said structural cellular plastic sheathing covering a portion of said core member with the portion of said elongated structural core member which is shaped to facilitate insertion of the composite structural member into the ground being void of said structural cellular plastic resin defining said sheathing,
   the upper end of said metal core member being exposed to the exterior of said sheathing to permit force to be applied directly to the end of said core member without damaging the upper end of the structural cellular plastic sheathing to permit forcing said composite structural member into the ground a degree such that the elongated structural member may be supported by and above the ground.

2. An elongated structural member in accordance with claim 1 having at least one cavity formed in said structural cellular plastic sheathing and a further structural member having a portion thereof disposed within said sheathing cavity and supported by said structural member above the ground.

3. An assembly as set forth in claim 2 wherein said further structural member is also supported by the wall portion of said sheathing defining said cavity in said sheathing.

4. An assembly in accordance with claim 2 wherein support for said further structural member is effected at least in part by said core member portion of said structural member.

5. An assembly in accordance with claim 2 wherein said further structural member is fastened to said core member of said structural member.

6. An assembly in accordance with claim 5 wherein said further structural member has a portion thereof welded to said core member.

7. A container in accordance with claim 5 including a fastener extending through a portion of said further structural member and said core member.

8. A structural member in accordance with claim 1 in which said core member is a solid metal rod and said sheathing comprises a cellular plastic structure surrounding the major portion of said rod.

9. A structural member in accordance with claim 1 wherein said core member is a metal tube which is tapered at the lower end thereof to facilitate its penetration into the ground.

10. A structural member in accordance with claim 1 including a plurality of cavities formed in said sheathing for supporting separate structural members having portions inserted into said cavities.

11. A structural member in accordance with claim 1 having a channel-like formation formed in said sheathing, and a plurality of serrations or teeth mold formed in and defining portions of the side walls of said channel-like formation for engaging and frictionally and mechanically retaining another structural member within said channel-like formation.

* * * * *